United States Patent [19]
Saeki et al.

[11] Patent Number: 5,140,057
[45] Date of Patent: Aug. 18, 1992

[54] CURABLE RESIN COMPOSITION

[75] Inventors: Koichiro Saeki; Koji Nagaoka; Ichimoto Akasaki, all of Yokohama, Japan

[73] Assignee: Nippon Shokubai Kagaku Kogyo Co., Ltd., Osaka, Japan

[21] Appl. No.: 615,180

[22] Filed: Nov. 19, 1990

[30] Foreign Application Priority Data

Nov. 20, 1989 [JP] Japan .................................. 1-299706
Dec. 22, 1989 [JP] Japan .................................. 1-331187

[51] Int. Cl.$^5$ ............................ C08K 5/11; C08K 5/16
[52] U.S. Cl. ...................................... 524/237; 524/314
[58] Field of Search ................ 524/314, 237; 525/386, 525/328.2

[56] References Cited

U.S. PATENT DOCUMENTS

| | | | |
|---|---|---|---|
| 3,037,969 | 6/1962 | Hankins et al. | 526/312 |
| 3,228,823 | 1/1966 | Sala et al. | 525/117 |
| 3,467,611 | 9/1969 | Wolonski | 525/208 |
| 3,497,485 | 2/1970 | Emmons et al. | 526/312 |
| 4,104,230 | 8/1978 | Chang et al. | 523/409 |
| 4,414,250 | 11/1983 | Costanza et al. | 525/491 |
| 4,452,922 | 6/1984 | Speranza et al. | 525/433 |

Primary Examiner—Joseph L. Schofer
Assistant Examiner—Jeffrey T. Smith
Attorney, Agent, or Firm—Burns, Doane, Swecker & Mathis

[57] ABSTRACT

The invention relates to a curable resin composition comprising (a) grafted primary amino group-containing polymer and (b) a dialkyl oxalate which excels in workability and reactivity and features prominence in resistance to chemicals, weatherability, versatility, etc.

3 Claims, No Drawings

CURABLE RESIN COMPOSITION

BACKGROUND OF THE INVENTION

1. Field of the Invention

This invention relates to a curable resin composition. More particularly, it relates to a curable resin compositon comprising a grafted primary amino group-containing polymer and a dialkyl oxalate.

2. Description of the Prior Art

Heretofore, as curable resin compositions, the curable resin compositions comprisnig a polyhydric alcohol compound such as polyester polyol or acryl polyol and a polyisocyanate compound and the curable resin compositions comprisnig a polyamine compound such as polyamine or polyamideamine and a polyepoxy compound have been used in various applications involving coating materials, adhesive agent, surface-treating agents, shaped articles, and foam resins. JP-A-61-23,615(1986) discloses a Michael addition type curable resin composition comprising apolyamine compound such as polyamine or polyamideamine and a polyacryloyl group and U.S. Pat. No. 4,414,250 discoses a curable resin composition comprising a polyamine compound and a dialkyl oxalate.

The curable resin compositions which comprise a polyhydric alcohol compound and a polyisocyanate compound feature prominence in reactivity, weatherability, versatility, etc. and yet entail the problem of toxicity of the isocyanate compound, the problem of basic unusableness of the composition in an aqueous system due to ready reactivity thereof with water, and the problem of management of the isocyanate compound for curbing the possible secondary reaction of the isocyanate compuond with water or moisture even when the composition is used in a solvent system or a nonsolvent system. These problems remain yet to be solved. The curable resin compositins which comprise a polyamien compound and epoxy resin feature prominence in reactivity, resistance to chemicals, versatility, etc. and yet entail the problem of deficiency in weatherability, low-temperature curing property, etc. The Michael addition type curing resin compositions which comprises a polyamine compund and a polyacryloyl group excel in low-temperature curable property, weatherability, etc. and yet entail the problem of deficiency in resistance to chemicals, gloss, etc. The curable resin compositions which comprise a polyamine cmopound such as polyamine or polyamideamine and a dialkyl oxalate suffer from the problem of slowness of the rise of the molecular weight of the composition due to the reaction between an oligomer and a monomer and the attendant problem of slowness of the manifestatin of stated physical properties. To eliminate the effects of these problems, curable resin compositions which comprise a dialkyl oxalate and a polyamine compound obtained by modifying with a polyamine a copolymer between a copolymerizable acid anhydride such as maleic anhydride and other copolymerizable monomer has been propsed. These curable resin compositions entail the problem of slowness of the manifestation of stated physical properties due to the failure of the acid anhydride group-containig copolymer to exhibit a sufficient rise in the conversion and also the problem of slowness or incompleteness of the curing reaction due to the formation of an inner salt with the residual carboxyl group.

An object of this invention, therefore, is to provide a novel curable resin composition.

Another object of this invention is to provide a curable resin compositon which is free from the problems observed, as described above, in the curable resin compositions comprisnig a polyhydric alcohol compound anda polyisocyanate compound, the curable resin compositions comprisng a polyamine compound and epoxy resin, and the Michael addition type curable resin compositions comprisnig a polyamine compound and a polyacryloyl group.

SUMMARY OF THE INVENTION

These objects are accomplished by a curable resion composition comprisng (a) a grafted primary amino group-containig polymer and (b) a dialkyl oxalate represented by the general formula I:

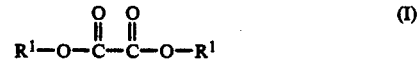

wherein $R^1$ is a lower alkyl group of 1 to 8 carbon atoms.

The curable resin composition of this invention, as clearly noted from the working examples cited hereinafter, defies the effects of moisture, water, etc., excels in workability and reactivity, and features prominence in resistance to chemicals, weatherability, versatility, etc. Owing to these characteristic qualities, this curable resin compositno finds extensive utility in various applications involving coating materials, adhesive agents, surface-treating agents, shaped articles, foam resin, etc.

EXPLANATION OF THE PREFERRED EMBODIMENT

The grafted primary amino group-containing polymers which are usable effectively in this invention include (A) those obtained by effecting aminalkyl modification on side-chain carboxyl group-containing polymers with an alkylene imine and (B) those obtained by hydrolyzing the ketimine moiety of a homopolymer polymerizing an unsaturated monomer (II) represented by the general formula II:

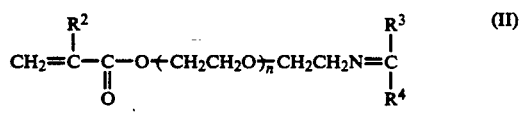

wherein $R^2$ is hydrogen atom or a lower alkyl group of 1 to 2 carbon atoms, $R^3$ and $R^4$ are independently a member selected from the class consisting of lower alkyl groups of 1 to 4 carbon atoms, and n is an integer in the range of 0 to 2, or a copolymer polymerizing the unsaturated monomer (II) represented by the general formula II with an unsaturated monomer copolymerizable with the monomer (II) of the general formula II mentioned above.

To be more specific, (A) the grafted primary amino group-containing polymer disclosed in U.S. Pat. Nos. 3,228,823, 3,467,611, and 4,104,230, and JP-A-63-56,549(1988), for example which is produced by subjecting a side chain carboxyl group-containnig polymer is aminoalkylation modification with an alkylene imine and used in the present invention is a grafted primary amino group-containing polymer obtained by copolymerizing a carboxyl group-containing unsaturated monomer with other copolymerizable unsaturated monomer (III) and aminoalkylating a carboxyl group of the resultant polymer through reaction thereof with an alkylene imine. Typical example of the copolymerizable monomer (III) is at least one member selected from the group consisting of (meth)acrylamides, N-methylol (meth)acrylamides, 2-hydroxyethyl (meth)acrylates, 2-hydroxypropyl (meth)acrylates, methyl (meth)acrylates, ethyl (meth)acrylates, n-propyl (meth)acrylates, isopropyl (meth)acrylates, n-butyl (meth)acrylates, isobutyl (meth)acrylates, t-butyl (meth)acrylates, 2-ethylhexyl (meth)acrylates, stearyl (meth)acrylates, lauryl (meth)acrylates, (meth)acrylonitriles, styrene, α-methyl styrene, vinyl acetate, vinyl propionate, (meth)acroleins dimethylaminoethyl (meth)acrylates, diethylaminoethyl (meth)acrylates, butadiene, ethylene, and propylene. The alkylene imines which are usable effectively herein include alkylene imines such as ethylene imine, propylene imine, and butylene imine. A N-(2-aminoalkyl)substituted alkylene imine such as N-(2-aminoethyl) aziridine, N-(2-aminopropyl) aziridien and N-(2-aminoehtyl) propylene imine can also be used, and ethylene imine and propylene imine are preferable.

(B) The product which is obtained by preparing a homopolymer of unsaturated monomer (II) represented by the general formula II or a copolymer between a polymerizable unsaturated monomer (II) represented by teh general formula II and an unsaturated monomer copolymerizable with the aforementioned monomer (III) and hydrolyzing the ketimine moiety of the resultant polymer is a polymer possessing a grafted primary amino group obtained by hydrolyzing a homopolymer of such a polymerizable unsaturated monomer as an acryloxyalkyl ketimine or an acryloxyalkyloxyalkyl ketimine disclosed in U.S. Pat. Nos. 3,037,969 and 3,497,485, for example, or a coplymer between such a ketimine-containing polymerizable unsaturated monomer as mentioned above and at least one copolymerizable unsaturated monomer (m).

The number average molecular weight of the grated primary amino group-containing polymers (A) and (B) is in the range of 3,000 to 2,500,000, preferably 5,000 to 1,500,000.

These copolymers (A) and (B) used in the present invention are obtained by polymerization such as solution polymerization, emulsion polymerization and suspension polymerization. As a polymerization initiator, for example, peroxide such as persulfate salts, hydrogen peroxide, benzoly peroxide cumemen peroxide, azobisisobutylonitrile, etc. can be used. Further, a chain transfer agnet such as t-dodecyl mercaptane and the like may be used together with the above mentioned polymerization initiator in order to obtain a desired moleuclar weight of the copolymer. The amount of the radical polymerization initiator to be used is in the range of 0.05 to 10% by weight, preferably 0.1 to 8% by weight, based on the total amount of the monomers.

The dialkyl oxalate (b) to be used in this invention is a dialkyl oxalate represented by the general formula I:

wherein $R^1$ is one member selected from the class consisting of lower alkyl groups of 1 to 8 carbon atoms, preferably 2 to 5 carbon atoms. The cialkyl oxalates which answer this description include dimethyl oxalate, diethyl oxalate, dipropyl oxalate, di-sio-propyl oxalate, di-n-butyl oxalate, di-iso-butyl oxalate, and di-ethylhexyl oxalate, for example.

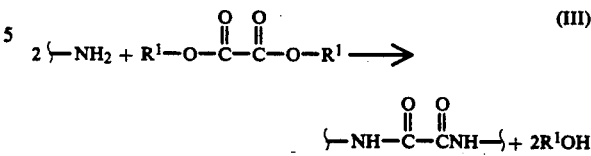

For the characterisitc physical properties of the cured product of the curable resin compositon of this invention to be manifested, it is theoretically necessary as clearly noted from the mechanism of curing shown above that one molecule of the dialkyl oxalate represented by the general formula I should undergo exchange reaction with two primary amino groups so as to induce the curing with an amide bond. The components of the composition of this invention can be used in a molar ratio indicated below, based on the theoretical curable defined above.

The molar ratio, (number of mols of the component of general formula I)/(number of mols of the primary amino group), is in the range of 0.1 to 2.0, preferably 0.2 to 1.0.

The reaction of curing is carried out at a temperature in the range of 4° to 250° C., preferably 10° to 200° C.

Now, the present invention will be described specifically below with reference to working examples. It should be noted, however, that this invention is not limited in any sense to these examples.

The term "part" used in the examples refers to "part by weight" and the term "%" to "% by weight".

REFERENTIAL EXAMPLE 1

In a flask having an inner volume of 1 liter and provided with a stirrer, a reflux condenser, a thermometer, a nitrogen inlet tube, and a dropping funnel, 336 parts of isopranol and 224 parts of toluene were placed and, under continued introduction of nitrogen gas, heated to 80° C. A polymerizable monomer mixture comprisnig of 72 parts of methacrylic acid, 120 parts of butyl acrylate, 48 parts of styrene, and 9.6 parts of azobisisobutylonitrile was added dropwise thereto over a period of two hours. After the additon, the resultant mixture was left aging at 80° C. for six hours and then cooled. Consequently, there was obtained an acrylic copolymer havign an involatile content of 30%. Then, this copoymer and 36 parts of ethylene imine added thereto at 25° C. were stirred for one hour, heated to 75° C., and left reacting at this temperature for five hours. After completion of this reaction, the flask was fitted with a distiller. The reaction solution in the flask was heated under a vacuum. The effluent from the flask was replenished with toluene and the isopropanl was allowed to flow out of the system in conjunction with the unaltered ethylene imine. The residual ethylene imine was thoroughly removed and then the involatile component was adjusted to 30% with methylisobutyl ketone, to obtain a grafted amine-containing acrylic copolymer.

REFERENTIAL EXAMPLE 2

In the same flask as used in Referential Example 1, 280 parts of isopropanol and 124.6 parts of n-butoxy ethanol were placed and, under continued introduction of nitrogen gas, heated to 80° C. A polymerizable monomer mixture comprisng of 80.5 pats of methacrylic acid, 63 parts of methyl methacrylate, 136.5 parts of butyl acrylate, 70 parts of styrene, and 9 parts of azobisisobutylonitrile was added dropwise thereto over a period of two hours. After completion of the addiont, the resultant mixture was left aging at 80° C. for six hours and then cooled, to obtain a polymer having an involatile content of 46.4%. The polymer and 33 parts of triethyl amine added thereto were uniformly mixed. The resultant mixture and 61.6 parts of an aqueous 37% ethyleneimnie solution added dropwise thereto were left reacting at 80° C. for four hours. The resulting reaction solution was combined with 8.4 parts of triethyl amine and 75 parts of deionized water, to produce a grafted amine-containing water-soluble acrylic copolymer having an involatile content of 40%.

REFERENTIAL EXAMPLE 3

In the same flask as used in Referential Example 1, 400 parts of deionized water and 40 parts of an anionic surfactant (25% aqueous solution) were placed and, under continued introduction of nitrogen gas, heated to 68° C. The resultant solution int he flas and 40 parts of a polymerizable monomer mixture comprising 48 parts of acrylic acid, 160 parts of 2-ethylhexyl acrylate, and 192 parts of styrene added thereto were stirred for 15 minutes. The resultant mixture was cured polymerizing by addition thereto of 4.6 parts of an aqueous 1.75% hydrogen peroxide solution and 4.2 parts of an aqueous 3% L-ascorbic acid solution. After elapse of 15 minutes following the start of polymerization, the remaining polymerizing monomer mixture was uniformly added dropwise thereto over a period of 90 minutes. In this while, 41 parts of an aqueous 1.75% hydrogen peroxide solution and 37 parts of an aqueous 3% L-ascorbic acid solution were added dropwise into the flas at intervals of 10 minutes until completion of the dropwise addition of the polymerizing mixture. After completion of the dropwise addition, the resultant mixture was left agign for one hour and then cooled. consequently, there was obtained a polymer emulsion having an involatile content of 44.5%. Then, 150 parts of this polymer emulsion and 40.6 parts of deionized water added thereto were uniformly mixed. The diluted polymer emulsion and 47.8 parts of an aqueous 10% ethhylene imine solution added thereto were left reacting at 50° C. for two hours, to obtain a grafted amine-containing acrylic copolymer emulsion having an involatile content of 30%.

REFERENTIAL EXAMPLE 4

IN the same flask as used in Referential Example 1, 520 parts of isopropanol was placed and, under continued introduction of nitrogen gas, heated to 80° C. A polymerizable monomer mixture comprising 50 parts of 2-[(1,3-dimethylbulyl)imino]ethyl methacrylate, 108 parts of 2-ethylhexyl acrylate, 147 parts of stryene, and 12.2 parts of azobisisobutylonitrile was added dropwise thereto over a period of two hours. After completion of the dropwise addition, the resultant mixture was left aging at 80° C. for six hours and cooled. A grafted primary amine-containing acrylic copolymer haivng an involatile content of 33.9% was obtained by adding 43 parts of deionized water to the aged mixture.

REFERENTIAL EXAMPLE 5

In the same flas as used in Referential Example 1, 540 parts of isopropanol was placed and, under continued introduction of nitrogen gas, heated to 80° C. A polymerizable monomer mixture comprising of 150 parts of 2-[(1-methylpropyl)imino]ethyl methacrylate, 100 parts of butyl acrylate, 40 parts of styrene, and 11 parts of azobisisobutylonitrile was added dropwise thereto over a period of two hours. After completion of the dropwise addition, the resultant mixture was left aging at 80° C. for six hours and cooled. A grafted primary amine-containing acrylic copolymer having an involatile content of 27.3% was obtained by adding 13.3 parts of deionized water to the aged mixture.

REFERENTIAL EXAMPLE 6

In the same flask as used in Referential Example 1, 434 parts of isopropyl alcohol and 186 parts of butyl cellosolve were placed and, under continued introduction of nitrogen gas, heated to 80° C. A polymerizable monomer mixture comprisnig 112 parts of 2-[(1,3-dimethylbutyl)imino]ethyl methacrylate, 63 parts of methyl methacrylate, 136.5 parts of butyl acrylate, 70 parts of styrene, and 9 parts of azobisisobutylonitrile was added dropwise thereto over a period of two hours. Afte rcompleton of the dropwise addition, the resultant mixture and 42 parts of triethyl amine added thereto were left aging at 80° C. for six hours and then cooled. A grafted primary amine-containing water-soluble acryl copolymer having an involatile content of 37% was obtained by adding 9.6 parts of deionized water to the aged mixture.

EXAMPLE 1

One hundredd (100) parts of the grafted amino group-containing acrylic copolymer obtained in Referential Example 1 as a main component and 7.6 parts of diethyl oxalate was uniformly mixed. The resultant mixture was subjected to the following test. The results are shown in Table 1.

Test of Coating for Curable Properties and Standard for Evaluation (1) Drying property: This property was determined by applying a sample of the mixture in a thickness of 75 μm on a glass plate with an applicator, measuring the driness of the applied layer by the touch of a finger with the aid of a drying meter, type RC, at 25° C. at a RH of 60%, and clockign the drying time for curable.

(2) Pencil hardness: This property was determiend by preparing an applied layer of the mixture similarly to (1) and measuring the scratch hardness of a pencil under a load of 250 g in accordance with the procedure of Japanese Industrial Standard (JIS) K-5400 using a pencil scratch tester.

(3) Gel content: This property was determiend by applying a sample of the mixture in a suitable amount on a plate of tetrafluoroethylene resin (Teflon), allowing the applied layer to age for seven days, then removing the set film from the plate, and treating the film with a Soxhlet extractor using acetone for four hours and measuring the amount of gel relative to the total amount of the film.

Separately, 100 parts of the main component mentioned above and 12 parts of titanium dioxide and a suitable amount of glass beads added thereto were mixed for mutual dispersion by the use of a paint shaker for two hours and then diluted to 700 cps. Similarly to the aforementioned mixture, the resultant diluted solution and diethyl oxalate added thereto were uniformly mixed to obtain a coating composition. This composition was subjected to the following test. The results are shown in Table 1.

Test of Film for Performance and Standard of Evaluation (4) Weatherability: This property was determined by applying a sample of the composition in a thickness of 75 μm on a stainless steel plate with an applicator, allowing the applied layer of the composition to age at 25 C. at a RH of 60% for seven days, then exposing this layer to the radiation in a sunshing type weather-o-meter for 240 hours in accordance with the procedure of JIS K-5400, and visually examining the layer as to the condition of film.

Resistance to Change Color

⊙: Absence of change
○; Sparing change of color
Δ; Slight change of color
×; Appreciable change of color

Gloss Retaining Ratio

Ratio of the gloss measured at time of test to the initial gloss.

(5) Resistance to solvent: This property was determined by preparing an applied layer of the composition similarly to (4), rubbing this layer with a cloth wetted with methylethyl ketone, and taking count of the rubbings until the film degenerated.

EXAMPLES 2-8

Mixtures and compositions shown in Table 2 were obtained by a similar method of Example 1 using grafted primary amino group-containing copolymers obtained in Referential Examples 1-6. These compositions were tested by following the procedure of Example 1. The results are shown in Table 1.

CONTROL 1

A mixture and a coating composition were prepared by following the procedure of Example 1, except that 19.9 parts of bis-phenol A type diglycidyl ether (epoxy compound produced by Yuka-Shell K.K. and marketed under trademark designation of "Epikote 828") was added instead to 100 parts of the grafted amine-containing acryl copolymer obtained in Referential Example 1. These mixture and coating composition were tested in the same manner as in Example 1. The results are shown in Table 1.

CONTROL 2

A mixture and a coating composition were prepared by following the procedure of Example 1, except that 19.9 parts of bis-phenol A type diglycidyl ether (epoxy compound produced by Yuka-Shell K.K. and marketed under trademark designation of "Epikote 828") was added instead to 100 parts of the grafted primary amine-containing acryl copolymer obtained in Referential Example 5. The mixture and the coating composition were tested in the same manner as in Example 1. The results are shown in Table 1.

CONTROL 3

One hundred (100) parts of a commercially available polyamideamine as a main component and 122 parts of Epikote 828 added thereto were uniformly mixed. This mixture was tested in the same manner as in Example 1. The results are shown in Table 1.

A coating composition was obtained by mixing 100 parts of the aforementioned main component with 18 parts of titanium dioxide and a suitable amount of glass beads and processing the resultant mixture by following the procedure of Example 1. This composition was tested in the same manner as in Example 1. The results are shown in Table 1.

CONTROL 4

One hundred (100) parts of a commercially available acryl polyol (toluene n-butyl acetate solution having a hydroxyl group number 80 mg KOH/g solid and an involatile content of 50%) as a main component and 18 parts of the trimer of 1,6-hexamethylene diisocyanate (ethyl acetate solution having a NCO content of 16.5% and an involatile content of 75%) added thereto were uniformly mixed. The resultant mixture was diluted with toluene. This mixture was tested in the same manner as in Example 1. The results are shown in Table 1.

Then, 100 parts of the aforementioned acryl polyol adjusted with toluene to an involatile content of 40% and 30 parts of titanium dioxide and a suitable amount of glass beads added thereto were mixed by following the procedure of Example 1. A coating composition was obtained by uniformly mixing the resultant mixture with 9.6 parts of the trimer of 1,6-hexamethylene diisocyanate (ethyl acetate solution having a NCO content of 16.5% and an involatile content of 75%). This composition was tested in the same manner as in Example 1. The results are shown in Table 1.

TABLE 1

| | | Example | | | | | | | | Control | | | |
|---|---|---|---|---|---|---|---|---|---|---|---|---|---|
| | | 1 | 2 | 3 | 4 | 5 | 6 | 7 | 8 | 1 | 2 | 3 | 4 |
| Drying property (hrs) | Driness by touch with fingers | 0.3 | 0.4 | 0.5 | 0.5 | 1.0 | 0.4 | 0.5 | 0.5 | 0.4 | 0.5 | 1.5 | 1.5 |
| | Driness for setting | 6 | 6.5 | 2 | 8 | 8.5 | 7 | 7 | 8.5 | 8 | 8.5 | 3 | 10 |
| Pencil hardness | | 2H | H | F | H | H | 2H | H | H | H. | H | HB | H |
| Gel content (%) | | 93 | 92 | 94 | 90 | 90 | 93 | 92 | 91 | 90 | 90 | 82 | 93 |
| Weatherability | Glass retaining ratio (%) | 97 | 94 | 90 | 96 | 97 | 95 | 94 | 94 | 60 | 68 | 50 | 96 |
| | Color difference | ⊙ | ⊙ | ⊙ | ⊙ | ⊙ | ⊙ | ⊙ | ⊙ | Δ | Δ | × | ⊙ |
| Resistance to solvent (number of rubbings) | | 108 | 110 | 102 | 98 | 97 | 107 | 102 | 100 | 95 | 97 | 20 | 97 |

TABLE 2

| | Example | | | | | |
|---|---|---|---|---|---|---|
| | 2 | 3 | 4 | 5 | 6 | 7 | 8 |
| Coating composition | | | | | | | |

TABLE 2-continued

| | | Example | | | | | | |
|---|---|---|---|---|---|---|---|---|
| | | 2 | 3 | 4 | 5 | 6 | 7 | 8 |
| Mixture | Main agent (grafted amino group-containing copolymer) (parts) | Referential Example 2 | Referential Example 3 | Referential Example 1 | Referential Example 4 | Referential Example 5 | Referential Example 6 | Referential Example 5 |
| | | 100 | 100 | 100 | 100 | 100 | 100 | 100 |
| | Diethyl oxalate | 4.4 | 3.7 | | 1.4 | 7.8 | 4.1 | |
| | Dibutyl oxalate | | | 10.6 | | | | 10.8 |
| Titanium dioxide | | 16 | 12 | 12 | 14 | 11 | 15 | 14 |

EXAMPLE 9

An adhesive agent was obtained by uniformly mixing 100 parts of the grafted primary amino group-containing acrylic copolymer emulsion obtained in Referential Example 3 with 3.7 parts of diethyl oxalate and 18 parts of a 15% aqueous solution of partially saponified polyvinyl alcohol whose 4% aqueous solution exhibited a viscosity of 56 cps at 25° C. This adhesive agent was applied to the opposed surfaces of two pieces of birch at a rate of 150 g/cm². The two pieces were applied to each other across the deposited layers of the adhesive agent and then joined fast at 25° C. under a squeezing pressure of 10 kg/cm² for one hour. The joined layers of the adhesive agent were left aging at 25° C. and 60% RH for three days and then tested for normal state adhesive strength and, after repeated boiling, tested for boil-resisting adhesive strength in terms of compression shear adhesive strength (kg.f/cm²) in accordance with JIS K-6852. The results are shown in Table 3.

EXAMPLE 10

In Example 9, a coating composition without using the partially saponified polyvinyl alcohol and was subjected to test. The result is shown in Table 3.

CONTROL 5

An adhesive agent was obtained by adding polyvinyl alcohol similarly to Example 9 to 100 parts of the grafted amine-containing acrylic copolymer emulsion obtained in Referential Example 3, further adding thereto 5.8 parts of ethylene glycol diglycidyl ether, and uniformly mixing them.

This adhesive agent was used and tested by following the procedure of Example 9. The results are shown in Table 3.

CONTROL 6

A two-component type aqueous vinyl urethane type adhesive agent exhibiting an involatile component of 46.8% after preparation was used and tested by following the procedure of Example 9. The results are shown in Table 3.

TABLE 3

| | Pot life (hrs) | Compression shear adhesive strength | |
|---|---|---|---|
| | | Normal state (kg·f/cm²) | After repeated boiling (kg·f/cm²) |
| Example 9 | 6< | 113 | 65 |
| Example 10 | 6< | 104 | 71 |
| Control 5 | 6< | 102 | 55 |
| Control 6 | 1> | 100 | 57 |

In Control 6, the adhesive agent began to increase viscosity and foam vigorously after 30 minutes and became unusable after 50 minutes, respectively following the time of preparation.

What is claimed is:

1. A curable resin composition comprising a dialkyl oxalate, and a grafted primary amino group-containing polymer obtained by hydrolyzing the ketimine moiety of a copolymer of polymerizable unsaturated monomer and an unsaturated monomer copolymerizable with said monomer, said dialkyl oxalate and said polymerizable unsaturated monomer being respectively represented by the formulae I and II:

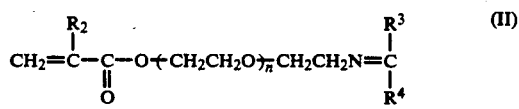

wherein $R^1$ is a lower alkyl group of 1 to 8 carbon atoms, $R^2$ is a hydrogen atom or a lower alkyl group of 1 or 2 carbon atoms, $R^3$ and $R^4$ are each independently selected from the group consisting of lower alkyl groups of 1 to 4 carbon atoms, and n is an integer having a value of 0 to 2.

2. The curable resin composition of claim 1, wherein the molar ratio of said dialkyl oxalate represented by the formula I to the amino group of said grafted primary amino group-containing polymer ranges from about 0.1 to 2.0.

3. The curable resin composition of claim 1, wherein $R^1$ is a lower alkyl group of 1 to 5 carbon atoms.

* * * * *